US011963037B2

(12) United States Patent
Torrini et al.

(10) Patent No.: US 11,963,037 B2
(45) Date of Patent: *Apr. 16, 2024

(54) COMPRESSION OF LOCATION INFORMATION DURING BACKHAUL COMMUNICATIONS OF A WIRELESS LOCATION SYSTEM

(71) Applicant: Silicon Laboratories Inc., Austin, TX (US)

(72) Inventors: Antonio Torrini, Austin, TX (US); Joel Kauppo, Espoo (FI); Sauli Johannes Lehtimaki, Nummela (FI)

(73) Assignee: Silicon Laboratories Inc., Austin, TX (US)

( * ) Notice: Subject to any disclaimer, the term of this patent is extended or adjusted under 35 U.S.C. 154(b) by 532 days.

This patent is subject to a terminal disclaimer.

(21) Appl. No.: 17/319,875

(22) Filed: May 13, 2021

(65) Prior Publication Data
US 2021/0266790 A1    Aug. 26, 2021

Related U.S. Application Data

(63) Continuation of application No. 16/229,052, filed on Dec. 21, 2018, now Pat. No. 11,044,631.

(51) Int. Cl.
*H04W 28/06*    (2009.01)
*H04W 4/02*     (2018.01)
(Continued)

(52) U.S. Cl.
CPC .......... *H04W 28/06* (2013.01); *H04W 4/025* (2013.01); *H04W 40/22* (2013.01); *H04W 64/003* (2013.01)

(58) Field of Classification Search
CPC ..... H04W 28/06; H04W 4/025; H04W 40/22; H04W 64/003; H04W 4/18; H04W 4/02; H04W 4/20
See application file for complete search history.

(56) References Cited

U.S. PATENT DOCUMENTS

2013/0262809 A1    10/2013   Wegener
2014/0213280 A1    7/2014    Sandel et al.
(Continued)

OTHER PUBLICATIONS

Costa, Mario et al. "DoA and Polarization Estimation for Arbitrary Array Configurations" IEEE Transactions on Signal Processing. vol. 60, No. 5, May 2012. pp. 2330-2343.

*Primary Examiner* — Charles C Jiang
*Assistant Examiner* — Debebe A Asefa
(74) *Attorney, Agent, or Firm* — Gary Stanford; Huffman Law Group, PC

(57) ABSTRACT

A wireless locator that facilitates determining a location of a nearby wireless asset including an antenna array with multiple antennas, at least one wireless transceiver that receives a location signal from the nearby wireless asset and that takes multiple samples from the location signal including a set of samples for each antenna, and a processor that compresses the samples to generate location information associated with the nearby wireless asset. The wireless locator may be part of a wireless location system including multiple wireless locators distributed in the area and a central processing system. Various compression methods are disclosed, including averaging of the samples, bit reduction of the samples, converting the samples to corresponding phase values, and combining corresponding samples of multiple sample supplemental sets. Combinations of the various compression methods are also disclosed.

20 Claims, 5 Drawing Sheets

(51) Int. Cl.
*H04W 40/22* (2009.01)
*H04W 64/00* (2009.01)

(56) References Cited

U.S. PATENT DOCUMENTS

2019/0053013 A1  2/2019  Markhovsky et al.
2019/0289426 A1  9/2019  Persson et al.

COMPRESSION OF LOCATION INFORMATION DURING BACKHAUL COMMUNICATIONS OF A WIRELESS LOCATION SYSTEM

BACKGROUND OF THE INVENTION

Field of the Invention

The present invention relates in general to a wireless location system, and more particularly to compressing location information for distribution between wireless locators to a central processing system.

Description of the Related Art

It is desirable or advantageous to track objects in an area, such as a factory, a store, a mall, etc., for various reasons. Wired sensors may be used but present a costly and complicated structure to build and maintain. Wireless technology is advancing yet may require delivery of a significant amount of location information from each wireless location device to a central processing system.

SUMMARY OF THE INVENTION

A wireless locator mounted at a fixed location in a facility that facilitates determining a location of a nearby wireless asset within the facility according to one embodiment includes an antenna array with multiple antennas, at least one wireless transceiver that receives a location signal from the nearby wireless asset and that takes multiple samples from the location signal including a set of samples for each of the antennas, a processor that compresses the samples to generate location information associated with the nearby wireless asset using at least one of multiple compression methods including averaging, bit reduction, phase angle only selection, and accumulation and selection, and in which the at least one wireless transceiver is configured to wirelessly transmit the location information to another wireless locator mounted at another fixed location within the facility.

Various methods of compression are disclosed. One compression method is to average each set of samples for each antenna of the antenna array to provide one average sample per antenna. Another compression method is to reduce the number of bits of each sample, such as by rounding or truncating or the like. Another compression method is to convert each complex sample to a phase value. The wireless asset may transmit multiple location signals over time in which the processor accumulates a corresponding set of samples as a supplemental for each location signal. Another compression method is to average corresponding samples of the multiple sets samples to provide averaged supplemental information. Another compression method is to select a representative supplemental from multiple supplemental sets. Supplementals may be combined when corresponding samples are sufficiently close and the supplementals are sufficiently close in time indicating that the wireless asset is not moving or is moving slowly.

Combinations of the compression methods are disclosed, such as reducing the number of bits by rounding or truncating averaged values, averaging each of the samples of supplemental information, averaging phase values, etc.

The wireless locator may include multiple wireless transceivers, including a first wireless transceiver for communication with wireless assets, and a second wireless transceiver for communication with other wireless locators. A set of switches or the like may be provided for coupling each wireless transceiver to the antenna array.

A wireless location system for locating at least one wireless asset in an area enclosed by a facility according to one embodiment includes multiple wireless locators distributed in the area and a central processing system. Each wireless locator includes a controller, at least one wireless transceiver and an antenna array, and each is capable of wirelessly communicating with at least one other wireless locator for conveying location information to the central processing system. The wireless transceiver of each wireless locator is configured to receive a wireless location signal from a nearby wireless asset and take multiple samples from the wireless location signal including a set of samples for each antenna of the antenna array. The controller of each wireless locator compresses the samples to generate the location information using at least one of multiple compression methods including averaging, bit reduction, phase angle only selection, and accumulation and selection.

A method of optimizing a backhaul communication network of a wireless location system in an area enclosed by a facility by each of multiple wireless locators is disclosed. The wireless locators are distributed in the facility and each includes an array of antennas. The wireless location system includes a central processing system that is configured to communicate with at least one of the wireless locators for gathering location information from each of the wireless locators. The method includes receiving a location signal from a nearby wireless asset and taking multiple samples from the location signal including a set of samples for each antenna, compressing the samples to generate compressed location information using at least one of multiple compression methods including averaging, bit reduction, phase angle only selection, and accumulation and selection, and wirelessly transmitting the compressed location information to another wireless locator in the location system. Similar compression methods may be used.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The inventors have recognized the limitations of wired location systems along with the distribution of location information in a wireless location system. They have therefor developed a system and method of compression of location information during backhaul communications of a wireless location system. Various compression methods are disclosed for compressing the location information along with combinations of the disclosed compression methods.

Figure 1:
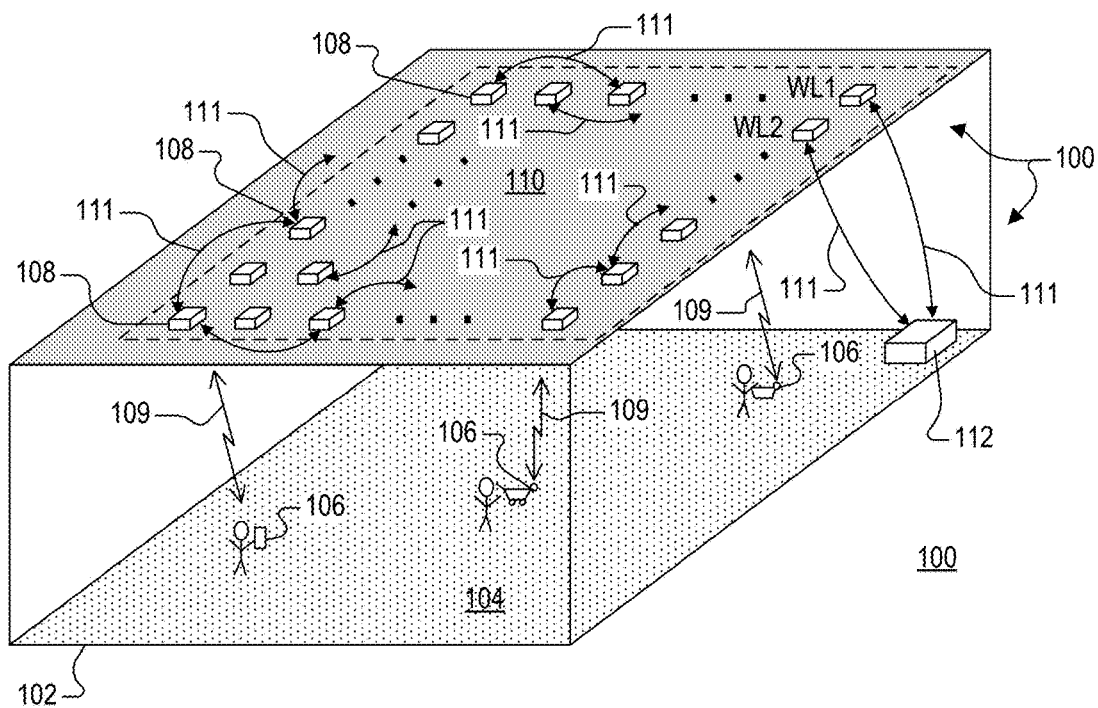
FIG. 1 is a simplified perspective view of a wireless location system installed within a facility enclosing an area in which it is desired to track the location of one or more wireless assets.

FIG. 1 is a simplified perspective view of a wireless location system 100 installed within a facility 102 enclosing an area 104 in which it is desired to track the location of one or more wireless assets 106. The facility 102 may be of any type and size, such as a warehouse, a factory, a department store, a shopping mall, a retail store, etc. The area 104 may be the floor of the facility 102 upon which the wireless assets 106 move, either manually (e.g., by a person) or automatically (e.g., a robot or automated cart or the like). Each wireless asset 106 is or otherwise includes a wireless communication device, such as a smartphone or other mobile electronic device, or may be a wireless device embedded in an object, such as a shopping cart or basket or the like.

The wireless location system 100 includes an array of wireless locators 108 mounted in strategic locations so as to view or otherwise detect the location of each wireless asset 106 roaming within the area 104. Each wireless locator 108 includes at least one wireless transceiver for communicating with one or more nearby wireless assets 106 as further described herein. A few dual-arrow lightening lines 109 are shown to depict wireless communications between the wireless locators and the wireless assets 106. The wireless locators 108 may be mounted along a ceiling 110 of the facility 102. Each wireless locator 108 may be mounted at a convenient location, such as within or adjacent one of multiple light fixtures or the like mounted along the ceiling 110 to illuminate the area 104. A light fixture or the like is particularly advantageous since already mounted for illuminating the portions of the area 104 in which the wireless assets 106 roam and further providing electricity for providing power to a wireless locator 108 mounted thereto.

The wireless locators 108 may be organized into a mesh or even an array or the like to provide complete coverage of the area 104 and so that each can wirelessly communicate with one or more other wireless locators 108. Several dual-arrow arced lines 111 depict backhaul communications between the wireless locators 108. The backhaul communications are extended to convey location information from each of the wireless locators 108 to a central processing system 112. The central processing system 112 may be a server or central computer system or the like, or may be a gateway or the like that communicates with remote servers (not shown) via the cloud (e.g., Internet). Although depicted in aligned rows and columns in FIG. 1 for purposes of illustration, such specific organization or alignment is not necessary; the wireless locators 108 may be distributed in any manner along the ceiling 110 or the like so that each is sufficiently near at least one other wireless locator 108 to provide a communication path to the processing system 112.

As described further below, the wireless locators 108 that are located at a significant distance from the processing system 112 such that direct wireless communications are not feasible, instead communicate information with one or more other nearby wireless locators 108 along a path towards the processing system 112. At least one of the wireless locators 108 communicates with the processing system 112 using either wired or wireless communications. In a wireless configuration, for example, multiple wireless locators 108 may be located in close proximity to the processing system 112 to enable direct wireless communication with the processing system 112. As shown, for example, two wireless locators 108 labeled WL1 and WL2 wirelessly communicate with the processing system 112. Alternatively, in a wired configuration (not shown) one or more of the wireless locators 108 may be a gateway device or may otherwise communicate with dedicated gateway device or the like that is wired to the processing system 112. In either case, the processing system 112 may directly or indirectly communicate with each of the wireless locators 108 in the wireless location system 100.

Figure 2:
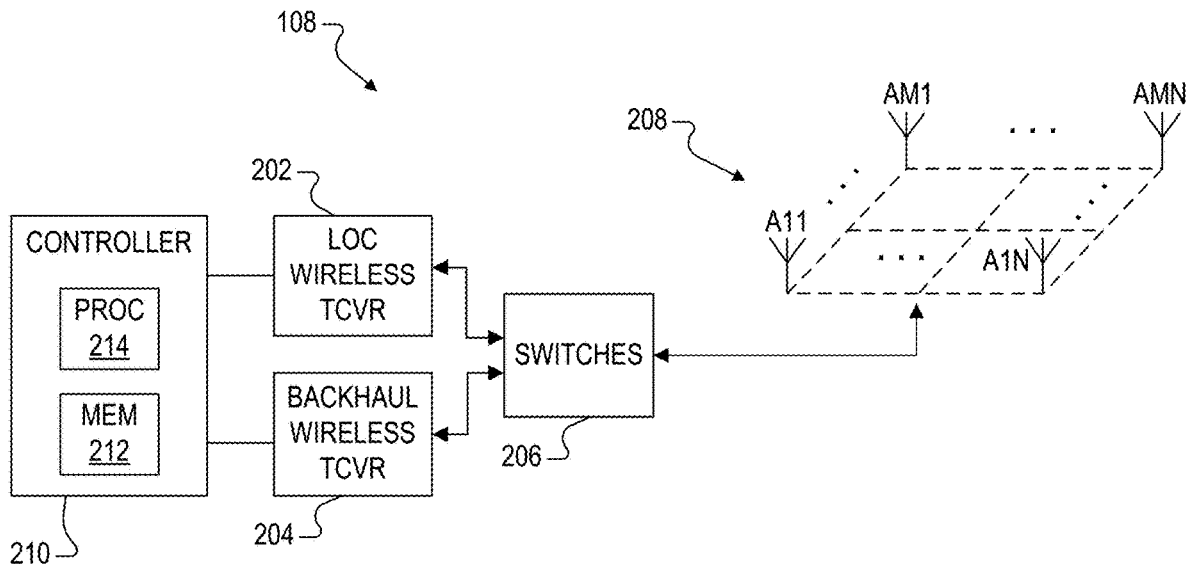
FIG. 2 is a simplified block diagram of the wireless locator of FIG. 1 implemented according to one embodiment.

FIG. 2 is a simplified block diagram of the wireless locator 108 implemented according to one embodiment. The illustrated wireless locator 108 includes a location (LOC) wireless transceiver (TCVR) 202, a backhaul wireless transceiver 204, a set of switches 206, an antenna array 208, and a controller 210. In one embodiment, the location wireless transceiver 202 is used to communicate with nearby ones of the wireless assets 106 for determining their locations and to generate location information, and the backhaul wireless transceiver 204 is used to communicate with other nearby wireless locators 108 or the processing system 112 via the wireless locator mesh or array. The controller 210 is used to control the mode of operation and to perform mathematical functions as further described herein. The modes of operation include a locator mode in which the location wireless transceiver 202 is activated, and a backhaul mode in which the backhaul wireless transceiver 204 is activated. The activated wireless transceiver controls the switches 206 to access the antenna array 208 for enabling wireless communications.

The illustrated antenna array 208 includes N rows of M antennas A11, . . . , AMN for a total of N×M antennas. N and M are each integers greater than zero (e.g., 1 or more). N and M may be equal, such as a 2×2 array, 3×3 array, 4×4 array, etc., or N and M may be different, such as 1×3, 2×3, 3×4, 3×1, etc. Many different antenna array configurations are possible and contemplated. Each of the wireless transceivers 202 and 204 may include one or more RX/TX channels for coupling to a corresponding one or more antennas of the antenna array 208. In one embodiment, each of the wireless transceivers 202 and 204 includes one communication channel each so that each may connect to only one antenna at a time. As described further herein, for the location function, the location wireless transceiver 202 connects to each of the antennas, one at a time, while taking one or more samples of a location signal transmitted by one of the wireless assets 106. For backhaul communications, the backhaul wireless transceiver 204 may perform receive diversity by toggling reception between two antennas for selecting one antenna with the strongest receive signal, and may perform transmit diversity by selecting from among the antennas of the array depending upon the relative location of the receiving wireless locator.

The controller 210 includes a memory 212 for storing data and information including, for example, samples of a location signal transmitted by a wireless asset 106 used for purposes of determining location information as further described herein. The controller 210 further includes a processor 214 for controlling various functions including mathematical and compression functions as further described herein. The processing may include accumulating location samples into the memory, averaging samples, reducing sample resolution (e.g., from 8 bits to 4 bits for each I, Q value), calculating phase information, averaging samples across multiple location signal supplementals, matrix multiplication, etc.

Figure 3:
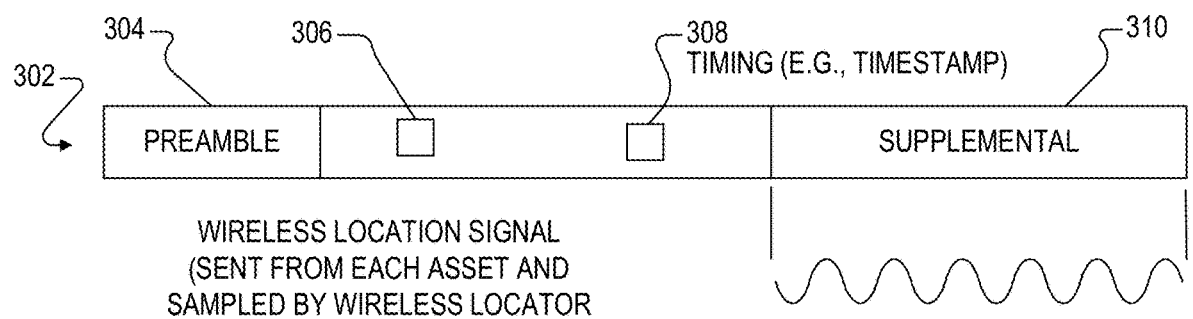
FIG. 3 is a simplified block diagram of a location packet encapsulated in a location signal transmitted by a wireless asset of FIG. 1 upon being prompting by a wireless locator.

FIG. 3 is a simplified block diagram of a location packet 302 encapsulated in a location signal transmitted by a wireless asset 106 upon being prompting by a wireless locator 108. The location packet 302 may include a preamble 304 which is used by the wireless locator 108 for detecting the signal and performing automatic gain control (AGC) functions and the like. The packet 302 further includes an identification (ID) field 306 containing an asset ID or the like for identifying the particular wireless asset 106 transmitting the location packet 302. Each wireless asset 106 includes a unique asset ID that enables the wireless locator 108 and the processing system 112 to distinguish between the different wireless assets 106. The location packet 302 further includes a timing field 308 containing timing information to identify when the location signal was transmitted, such as a timestamp or the like. The timing information may be useful for determining when to compress or consolidate location information accumulated for a given wireless asset 106 as further described herein.

The location packet 302 also includes a supplemental portion 310 that is sampled by one or more wireless locators 108 for locating the position of a wireless asset 106 being tracked. In one embodiment, for example, the supplemental portion 310 contains a tone signal or the like. In a more specific embodiment, the tone signal is a pure tone having a frequency of 250 Kilohertz (KHz) corresponding to a period of 4 microseconds (μs). In one embodiment, each wireless asset 106 and the location wireless transceiver 202 may be configured according to the Bluetooth wireless technology protocol. Alternative wireless protocols are contemplated.

In one embodiment, a wireless locator 108 requests a nearby wireless asset 106 to transmit a location signal. In the alternative, or in addition, the wireless asset 106 is configured to periodically broadcast a location signal. The wireless asset 106 may also broadcast a beacon signal or like indicating its presence, in which case one or more wireless locators 108 request the wireless asset 106 to transmit a location signal. In one embodiment, only the requesting wireless locator 108 receives and samples a location signal being transmitted by a wireless asset 106. In another embodiment, multiple nearby wireless locators 108 may sample a location signal being broadcast by a nearby wireless asset 106.

Figure 4:
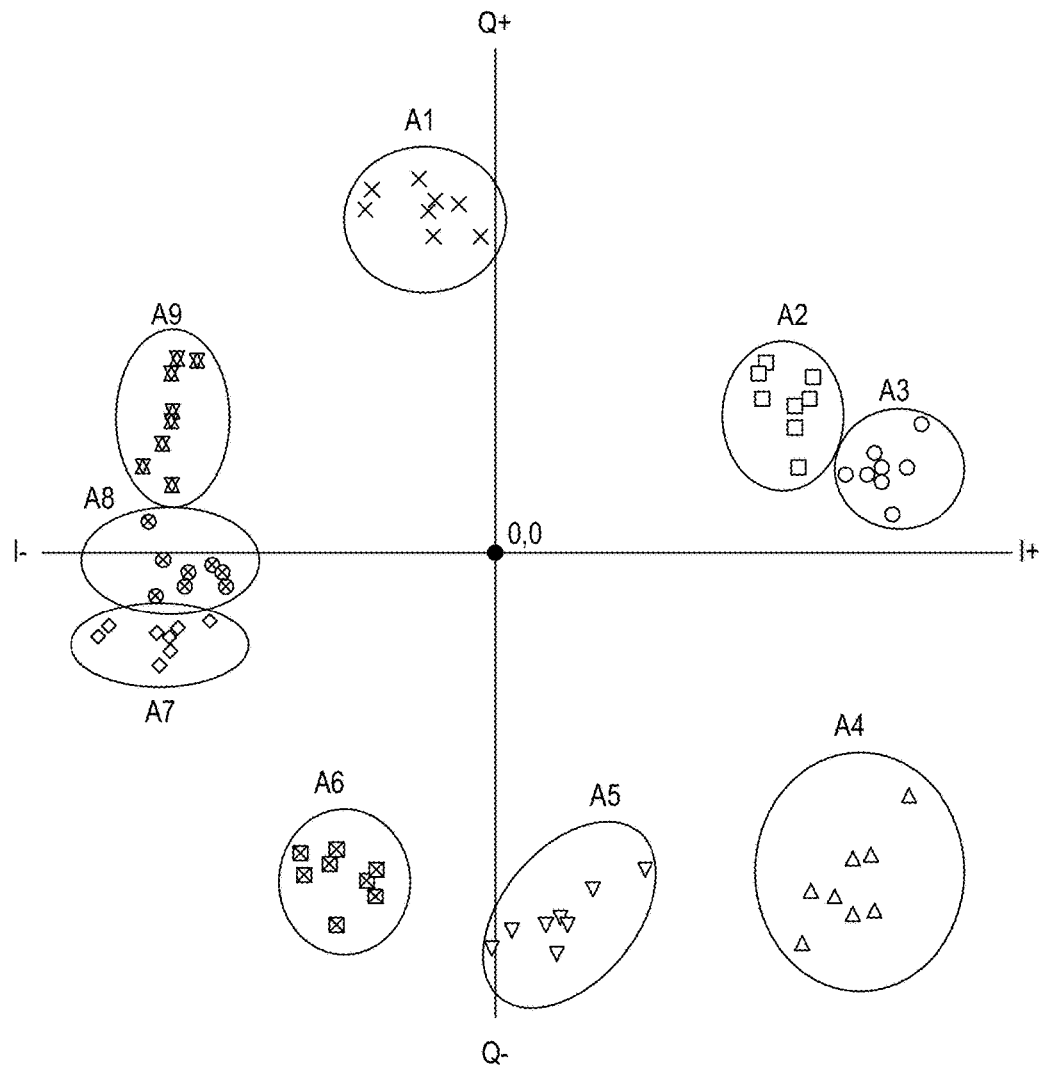
FIG. 4 is a graphic diagram plotting multiple samples taken by a wireless locator of FIG. 1 of a location signal transmitted by a wireless asset according to one embodiment.

FIG. 4 is a graph diagram plotting multiple samples taken by a wireless locator 108 of a location signal transmitted by a wireless asset 106 according to one embodiment. Each sample is plotted on a complex plane with in-phase values (I) along the horizontal axis (or x-axis) and quadrature values (Q) along the vertical axis (or y-axis). While the supplemental portion 310 is being transmitted, the locator wireless transceiver 202 of a wireless locator 108 rotates or toggles connection among the antennas of the antenna array 208 so that each antenna takes one or more complex samples of a supplemental of a location signal. A full set of samples may be taken by each antenna before transitioning to the next antenna. Alternatively, each antenna takes one sample (or a subset of samples) and operation transitions to the next sample for the entire duration of the supplemental portion 310.

As shown in FIG. 4, the samples tend to cluster together for each antenna after correction for all sources of sample rotation has been performed. For example, a first sample cluster is taken by a first antenna A1, a second sample cluster is taken by a second antenna A2, and so on for each of the antennas of the antenna array 208. In the illustrated case, the antenna array 208 is a 3×3 antenna array and each of 9 antennas A1-A9 take 8 different samples of the supplemental portion 310 of the location signal. Each sample may be a complex number with in-phase and quadrature values I, Q. In a more specific configuration, each in-phase and quadrature value is an 8-bit value for a total of 16 bits per sample.

Figure 5:
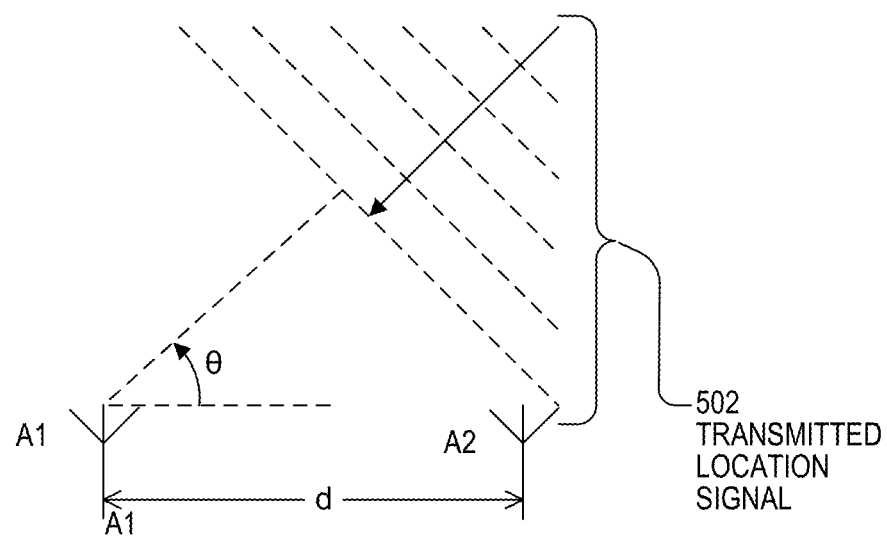
FIG. 5 is a graphic diagram depicting calculation of the angle of arrival (AoA) of a transmitted location signal arriving at two antennas A1 and A2 of the antenna array of FIG. 2.

FIG. 5 is a graphic diagram depicting calculation of the angle of arrival (AoA) θ of a transmitted location signal arriving at two antennas A1 and A2 of the antenna array 208. Although AoA is referenced here, similar techniques are used to determine angle of departure (AoD), in which AoA and/or AoD may be more generally referred to as AoX. The AoA θ may be calculated according to the following equation (1):

$$\theta = \cos^{-1}(\varphi\lambda/2\pi d) \qquad (1)$$

in which φ is the phase difference in the signal arriving at the two antennas A1 and A2, λ is the wavelength of the transmitted tone signal, and "d" is the distance between the two antennas. In this case, θ represents the AoA between only 2 antennas. As previously noted, multiple samples are taken for each antenna of a 2 dimensional (2D) antenna array. Thus, the algorithm may be extended in two directions for determining a three dimensional (3D) AoA for the antenna array 208 of a given wireless locator 108. 3D AoA may mean azimuth and elevation angles such as used in a spherical coordinate system. As further described herein, multiple wireless locators 108 may be used to track each wireless asset 106 in which each provides 3D AoA information. The collective location information from multiple wireless locators 108 may be processed by the processing system 112 executing the MUltiple SIgnal Classification (MUSIC) algorithm to identify the actual location of the wireless asset 106 in the area 104. Variations of the MUSIC algorithm may be used (e.g., root-MUSIC), as well as other algorithms, such as MVDR (Minimum Variance Distortionless Response), Conventional beamformer (Bartlett beamformer), multidimensional (iterative) a tan( ) calculation, and so on.

Figure 6:
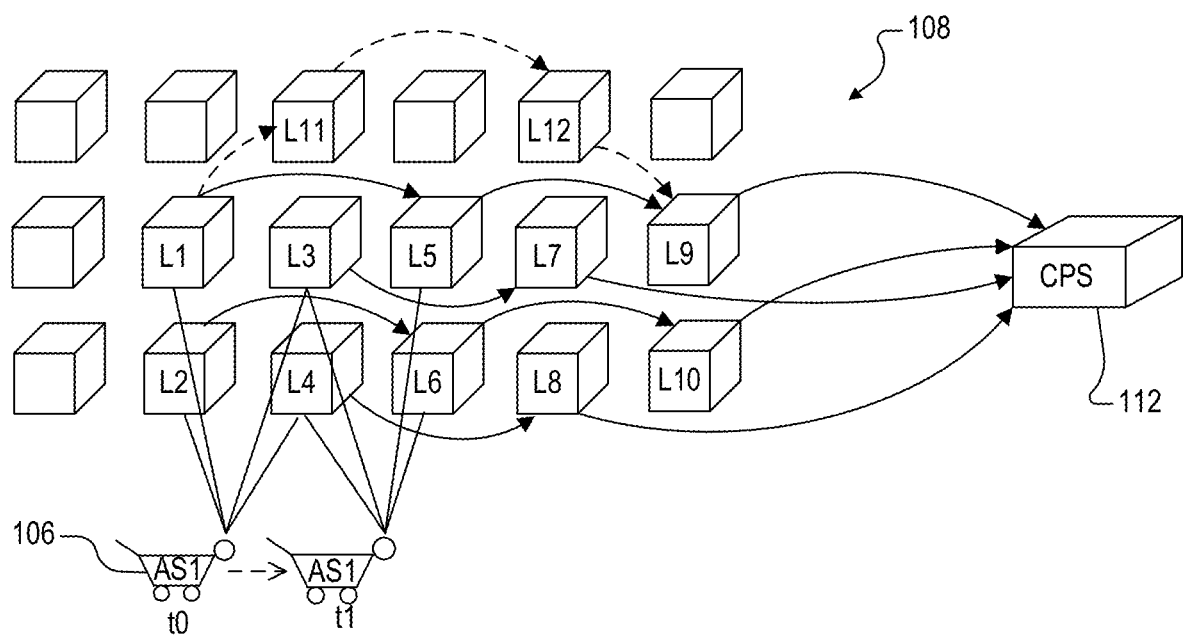
FIG. 6 is a figurative diagram illustrating operation of the array of wireless locators according to one embodiment for performing both location operations and backhaul communications including communication of location information to the central processing system of FIG. 1.

FIG. 6 is a figurative diagram illustrating operation of the array of wireless locators 108 according to one embodiment for performing both location operations and backhaul communications including communication of location information to the processing system 112. At a first time t0, a wireless asset labeled AS1 is positioned directly below or otherwise nearby a set of 4 different wireless locators 108 individually labeled L1, L2, L3 and L4. In this manner, at about time t0, each of the wireless locators L1-L4 are sampling one or more location signals transmitted by the wireless asset AS1. In this case, the wireless asset AS1 moves within the area 104 and reaches a new position at about a subsequent time t1 in which it is now nearby wireless locators 108 individually labeled L3, L4, L5 and L6. Sometime between times t0 and t1, the wireless locators L1 and L2 drop off and stop tracking while the wireless locators L5 and L6 detect and begin tracking the wireless asset AS1.

The decision by a wireless locator 108 of whether to track a wireless asset 106 may be determined based on signal strength. In one embodiment, for example, when the strength of a wireless signal transmitted by a wireless asset 106, such as AS1, is received at or above a predetermined strength threshold STH, the wireless locator begins tracking the wireless asset. The signal strength may be determined by a signal detector within the location wireless transceiver 202, such as a peak detector or the like. When the strength of the received wireless signal drops below STH, the wireless locator 108 stops tracking the wireless asset 106. It is noted that the strength threshold STH may be implemented with hysteresis including upper and lower thresholds rather than a single threshold. For example, the wireless locator 108 begins tracking when the received signal strength reaches an upper strength threshold STH_HI, and stops tracking when the received signal strength falls to a lower strength threshold STH_LO, in which STH_HI is slightly greater than STH_LO.

The core-MUSIC algorithm is computationally complex and may exceed the local processing capabilities of each of the wireless locators 108. It is appreciated, therefore, that all of the location information from each of the wireless locators 112 is transmitted to the processing system 112 for location determination of each of the wireless assets 106 in the area 104. After a wireless locator 108 generates location information or receives location information from other wireless locators, it transitions to the backhaul mode by enabling the backhaul wireless transceiver 204 for transmitting the location information to the processing system 112. The wireless locator L1, however, is not close enough to the processing system 112 to directly communicate with the processing system 112. Instead, the wireless locator L1 transmits its location information to the wireless locator L5. The wireless locator L5 may also not be close enough to transmit directly to the processing system 112, so that it relays the location information to another wireless locator L9. The wireless locator L9 is sufficiently close to transmit the location information directly to the processing system 112. In this manner, the location information from the wireless locator L1 experiences 3 "hops" to arrive at the processing system 112 (e.g., L1→L5, L5→L9, L9→processing system 112). In a similar manner, location information from L2 is transmitted to L6, which then transmits to L10, which finally transmits to the processing system 112. Location information from L3 is transmitted to L7 and then to the processing system 112 in only 2 hops. Similarly, location information from L4 is transmitted to L8 and then to the processing system 112. Location information from L5 is relayed through L9 to the processing system 112, and location information from L6 is relayed through L10 to the processing system 112.

It is noted that the particular backhaul communication paths are exemplary only and may be different depending upon the particular configuration and communication conditions and may be dynamically modified or updated over time. For example, L1 may instead send location information to a wireless locator L11, which relays the information to another wireless locator L12, which relays the information to L9, which relays the information to the processing system 112. In addition, the backhaul communication paths may be dynamic and may change over time or if and when wireless communications conditions change.

It is appreciated that many of the wireless locators 108 of the locator array are not only collecting location information from wireless assets 106, but are also relaying location information from other wireless locators 108. Furthermore, the wireless locators 108 closest to the processing system 112, such as L9 and L10, are relaying location information from many wireless locators 108 in the locator array to the processing system 112.

Each backhaul wireless transmission payload has a practical limit. In a specific embodiment, the backhaul wireless transceiver 204 is configured according to Zigbee and has a payload limitation of 74*2*8=1,184 bits. This payload may have to include an asset ID and the timing information. As an example, each wireless locator 108 may have a 3×3 antenna array in which each antenna collects 8 16-bit I, Q samples for a total of 1152 bits. Although this information should be conveyed in one wireless transmission, the additional information such as asset ID and timing information may overload the packet. Also, since many if not most of the wireless locators 108 are transmitting their own location information and relaying the location information of other wireless locators, the backhaul bandwidth may be constrained especially in larger installations.

Figure 7:
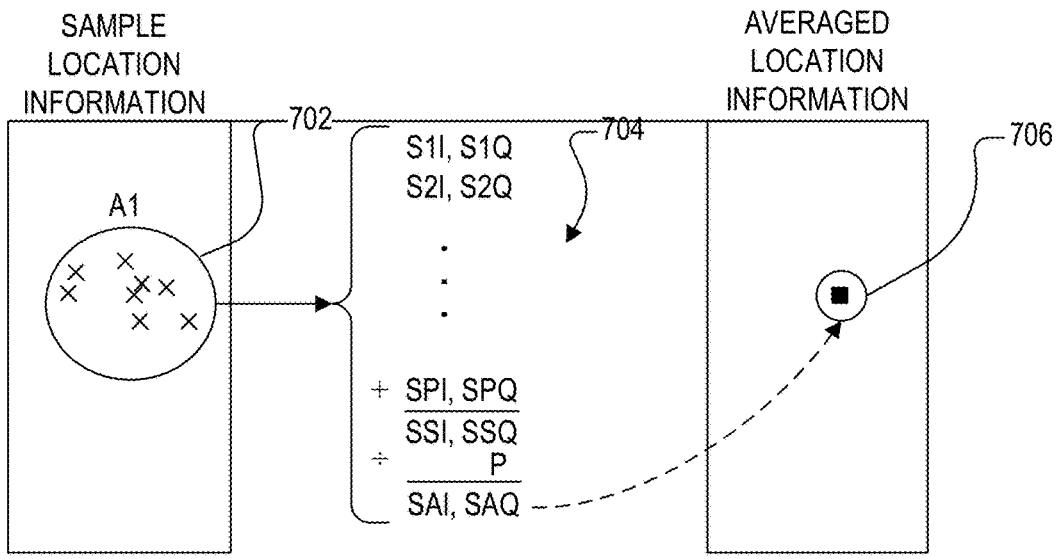
FIG. 7 is a graphic diagram illustrating a first method of compressing location information according to one embodiment in which multiple location samples are averaged into a single sample for each antenna of the antenna array of FIG. 2 as the corresponding location information.

FIG. 7 is a graphic diagram illustrating a first method of compressing location information according to one embodiment in which multiple location samples are averaged into a single sample for each antenna of the antenna array 208 as the corresponding location information. A cluster of P samples 702 for one of the antennas of the antenna array 208 (e.g., antenna A1) are averaged as shown at 704 resulting in one average value shown at 706 (in which "P" is an integer). The averaging is performed by the processor 214 for each of the antennas, so that the location information includes only one averaged sample for each antenna. As shown at 704, averaging may be performed by separately added together the I and Q values S×I, S×Q of each antenna, and then dividing each I and Q sum value SAI and SAQ by P resulting in an averaged value SAI, SAQ. The amount of sample data is reduced by a factor of P. In one embodiment in which 8 samples are taken for each antenna, for example, the amount of data is reduced by a factor of 8. In this manner, rather than sending the P sample values to the processing system 112 per antenna, only one averaged sample value is sent. Empirical results have revealed that the impact on performance is relatively small and even negligible.

The averaging illustrated in FIG. 7 may be according to an arithmetic method, although other types of averaging may be used, such as geometric averaging or the like. The present invention is not limited to any particular averaging technique; any averaging method that reduces the amount of information or number of bits of the location information to be conveyed may be used.

Figure 8:
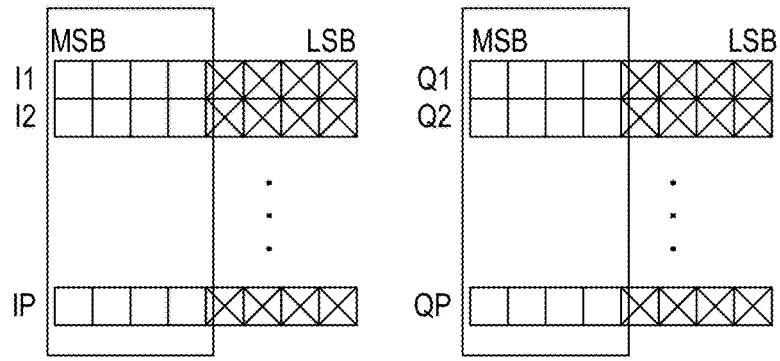
FIG. 8 is a figurative diagram illustrating a second method of compressing location information according to one embodiment in which at least one least significant bit (LSB) of each sample is discarded to reduce location information resolution.

FIG. 8 is a figurative diagram illustrating a second method of compressing location information according to one embodiment in which the number of bits are reduced to reduce location information resolution. A set of P samples each including an I value (I1, I2, . . . , IP) and a Q value (Q1, Q2, . . . , QP) are shown, such as would be taken for one antenna of the antenna array 208. In the illustrated embodiment, each I and Q value includes 8 bits from a most significant bit (MSB) to the LSB. In one embodiment, the I and Q values are truncated in which four LSB's are discarded as indicated by an "X" so that the remaining 4 MSB's are used for a resolution reduction factor of 2. In various embodiments, each I and Q sample value may be truncated by to number of bits so long as the remaining bits provide sufficient information for a particular configuration. Empirical results using 8-bit samples have revealed that discarding the LSB half of each sample value reduces the data by a factor of 2 with only a relatively small reduction of performance.

A more accurate alternative to truncation is rounding of the samples or values. It is also noted that when averaging and bit reduction are combined, that the summation of the samples may be performed first before bit reduction (truncation or rounding or the like) to avoid accumulation of quantization errors.

Figure 9:
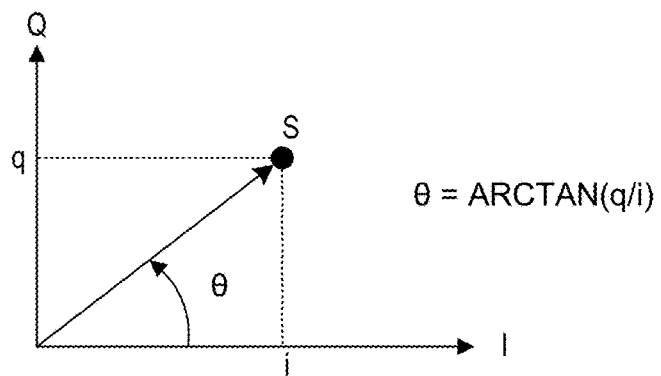
FIG. 9 is a figurative diagram illustrating a third method of compressing location information according to one embodiment in which the phase information is calculated and used as the location information for each sample rather than the I and Q values.

FIG. 9 is a figurative diagram illustrating a third method of compressing location information according to one embodiment in which the phase information is calculated and used as the location information for each sample rather than the I and Q values. As shown, a sample value S is plotted in the complex plane with an I value i and a Q value q with a corresponding phase angle $\theta$. The i and q values each include R bits (in which "R" is an integer, e.g., 8) for a total of 2R bits per sample. The phase angle $\theta$ is calculated by the processor 214 as the arctangent of the i and q values, or $\theta$=ARCTAN(q/i) with a total of R bits. In this manner, by calculating and using only the phase value as the location information, the amount of data is decreased by a factor of two. Empirical results of calculating and using only the phase data has a significant impact on performance for some configurations but is sufficient for most applications.

It is noted that switching to computation of the phases is sufficiently accurate only when amplitude deviation is within a threshold value. Should the amplitudes of the samples deviate more than the threshold value, conversion to phase may result in less accurate results.

Figure 10:
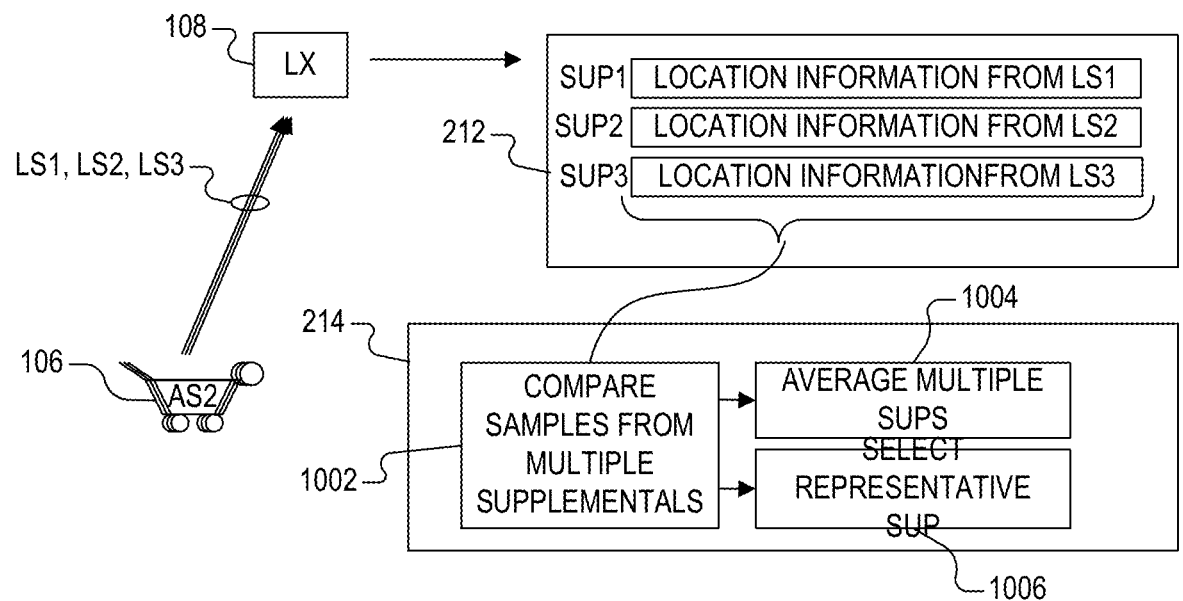
FIG. 10 is a figurative diagram illustrating a fourth method of compressing location information according to one embodiment in which samples taken from multiple location signal supplementals are compressed either by averaging or selection.

FIG. 10 is a figurative diagram illustrating a fourth method of compressing location information according to one embodiment in which location information taken from multiple location signal supplementals are compressed either by combining or selection. A wireless asset 106, labeled AS2, is tracked by a wireless locator 108, labeled LX. AS2 is either stationary or moving very slowly within the area 104, while it transmits multiple location signals shown as LS1, LS2, and LS3. LX receives the location signals LS1-LS3 and, for each location signal, collects multiple samples from each antenna in its antenna array. The collection of samples from each supplemental of corresponding location signals is used to generate location information stored as a "supplemental" so that a first supplemental SUP1 includes location information generated from the first location signal LS1, a second supplemental SUP2 includes location information generated from the second location signal LS2, and a third supplemental SUP3 includes location information generated from the third location signal LS3. Although only 3 supplementals are shown, it is understood that over time AS2 may send any number of location signal and LX may correspondingly generate any number of supplementals.

The supplemental location information stored as SUP1, SUP2, SUP3, etc., may simply be the collection of samples taken by the antenna array 208. Alternatively, the supplemental location information may be compressed location information, such as averaged samples as shown in FIG. 7, bit-reduce values shown in FIG. 8, phase values shown in FIG. 9, etc.

In a first embodiment, LX may simply send each supplemental to the processing system 112. Any one or more of the previously described compression methods may be used to reduce the amount of location information transmitted via backhaul communications. In a second embodiment, the processor 214 compares multiple supplementals, such as the supplementals SUP1, SUP2 and SUP3, to identify a relative amount of movement without actually calculating an AoA for any one of the supplementals. As an example, the processor 214 may compare each sample or value of each supplemental with the corresponding sample or value from another supplemental. This may involve a substantial number of comparisons since multiple samples are collected for each of multiple antennas. Alternatively, the processor 214 may first average the multiple samples of each antenna for each supplemental together, such as shown and described for FIG. 7, and instead compare the averaged sample values. In either case, the processor 214 may then determine whether each comparison is within a predetermined threshold.

If the results of the comparison reveal that AS2 is not moving or moving very slowly, such that the supplementals are sufficiently close to one another, such as within a predetermined threshold, then the processor 214 may compress the information in any one of several different ways. In a first method as shown at 1004, the processor 214 may combine multiple supplementals together such as by averaging the supplementals. Averaging may mean that each sample or value is averaged with the corresponding sample or value of one or more other supplementals that are sufficiently close. Alternatively, averaging may mean that each averaged sample or value is further averaged together with the corresponding averaged sample or value of one or more other supplementals that are sufficiently close. In this manner, rather than sending each supplemental independently, one or more of the supplementals are combined together so that only one combined (e.g., averaged) supplemental is transmitted to the processing system 112.

For example, if it is determined that the three supplementals SUP1-SUP3 are sufficiently close to one another and that each are within a predetermined time period (e.g., comparison of timestamped values for each supplemental), then LX may send one averaged supplemental to represent SUP1-SUP3 rather than sending each of the supplementals SUP-SUP3. Averaging is one method of combining supplementals although other types of supplemental combination are contemplated. The combined supplemental represents the multiple supplementals that were combined.

In a second method as shown at 1006, the processor 214 may select one of the supplementals to represent multiple supplementals. For example, if it is determined that the three supplementals SUP1-SUP3 are sufficiently close to one another and that each are within a predetermined time period (e.g., comparison of timestamped values for each supplemental), then LX may select and send any one of the supplementals, such as SUP2, rather than sending all of the supplementals SUP1-SUP3. In this case, since SUP1 and SUP3 are sufficiently close to SUP2 and all three are within a predetermined time period, then SUP2 sufficiently represents all three of the supplementals.

In addition, the timing information may be averaged and attached to the representative supplemental. For example, if the values of multiple supplementals are averaged together into one representative supplemental, then the timestamp values may also be averaged and stored into the representative supplemental. In the case in which one of multiple supplementals is selected as a representative supplemental of the multiple supplementals, the corresponding timestamp may remain unmodified or may be an average timestamp value of the multiple supplementals.

It is noted that even when multiple supplementals are sufficiently close to each other or even almost the same over a long period of time, such as when AS2 is effectively stationary for many seconds or minutes, that LX may still send an averaged or selected supplemental on a periodic basis, such as every 10 milliseconds (ms), every 100 ms, every 500 ms, etc. The time differential may be programmable according to a particular configuration or according to variable conditions in the area 104.

Figure 11:
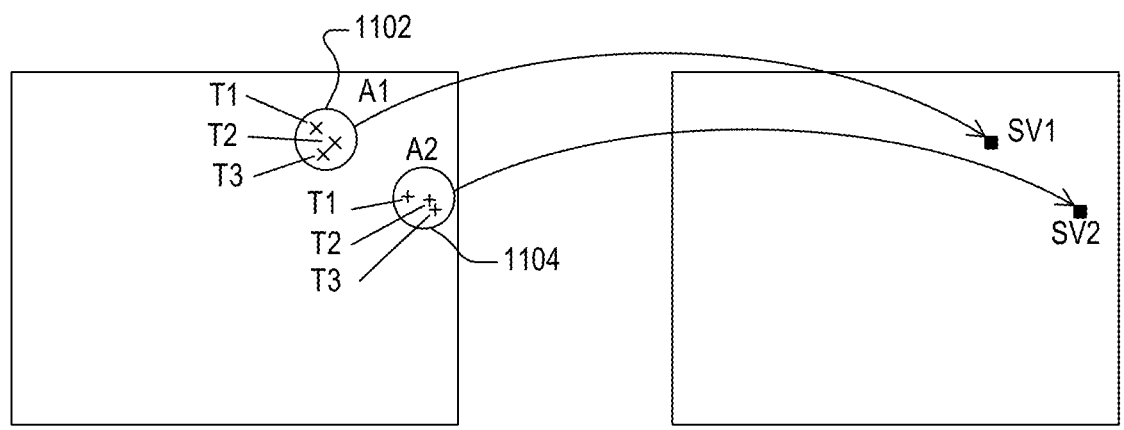
FIG. 11 is a graphic illustration of combining or otherwise averaging corresponding samples from multiple supplementals according to one embodiment.

FIG. 11 is a graphic illustration of combining or otherwise averaging corresponding samples from multiple supplementals according to one embodiment. Three corresponding samples clustered at 1102 corresponding to supplementals taken at corresponding times T1, T2 and T3 for a first antenna A1 are averaged together to provide a corresponding averaged sample value SV1. For the same supplemental compression, three corresponding samples clustered at 1104 corresponding to the supplementals taken at corresponding times T1, T2 and T3 for a second antenna A2 are averaged together to provide a corresponding averaged sample value SV2. This process is repeated for each group of corresponding samples for each of the three supplementals.

It is noted that a combination of the compression methods may be performed. When combining or selecting supplementals, for example, the sample values may first be averaged (FIG. 7) or reduced (FIG. 8) or first converted to phase values (FIG. 9). Sample values may be averaged and then bit-reduced or bit-reduced and then averaged. The sample values may be converted to phase values that are then averaged or bit-reduced or both (e.g., averaged and then reduced or reduced and then averaged). In any given configuration or implementation, empirical results may be examined to identify the optimal compression methods.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A wireless locator mounted at a fixed location in a facility that facilitates determining a location of a nearby wireless asset within the facility, comprising:
  a plurality of antennas configured in an antenna array;
  at least one wireless transceiver that receives a location signal from the nearby wireless asset and that takes a plurality of samples from said location signal including a set of samples for each of said plurality of antennas; and
  a processor that compresses said plurality of samples to generate location information associated with the nearby wireless asset, wherein said processor compresses said plurality of samples using at least one of multiple compression methods including averaging, bit reduction, phase angle only selection, and accumulation and selection;
  wherein said at least one wireless transceiver is configured to wirelessly transmit said location information to another wireless locator mounted at another fixed location within the facility.

2. The wireless locator of claim 1, wherein said processor compresses said plurality of samples by averaging each said set of samples for each of said plurality of antennas to provide a plurality of averaged samples as said location information.

3. The wireless locator of claim 2, wherein said processor further reduces a number of bits of each of each of said plurality of averaged samples.

4. The wireless locator of claim 1, wherein said processor accumulates multiple sets of said plurality of samples corresponding to multiple location signals provided by the nearby wireless asset, and wherein said processor then compresses said plurality of samples by first averaging each of said multiple sets of said plurality of samples to provide a plurality of sets of averaged samples, and then averages said plurality of sets of averaged samples to provide averaged supplemental information as said location information.

5. The wireless locator of claim 1, wherein said processor compresses said plurality of samples by reducing a number of bits of each of said plurality of samples to provide a plurality of reduced samples as said location information.

6. The wireless locator of claim 1, wherein each of said plurality of samples comprises a complex number, and wherein said processor compresses said plurality of samples by converting each of said plurality of samples to a phase angle to provide only a plurality of phase angles as said location information.

7. The wireless locator of claim 6, wherein said processor further averages each of said plurality of phase angles to provide a plurality of averaged phase angles as said location information.

8. The wireless locator of claim 1, wherein said processor accumulates multiple sets of said plurality of samples corresponding to multiple location signals provided by the nearby wireless asset, and wherein said processor then compresses said plurality of samples by averaging corresponding samples of said multiple sets of said plurality of samples to provide averaged supplemental information as said location information.

9. The wireless locator of claim 8, wherein said processor further averages each said set of samples of said averaged supplemental information for each of said plurality of antennas.

10. The wireless locator of claim 8, wherein said processor averages only those sets of said plurality of samples that are within a predetermined time differential.

11. The wireless locator of claim 1, wherein said processor accumulates multiple sets of said plurality of samples corresponding to multiple location signals provided by the nearby wireless asset, and wherein said processor then selects one of said multiple sets of said plurality of samples to provide representative supplemental information as said location information.

12. The wireless locator of claim 1, wherein:
said at least one wireless transceiver comprises:
- a first wireless transceiver that is configured to receive said location signal from the nearby wireless asset; and
- a second wireless transceiver that is configured to transmit said location information to another nearby wireless locator; and
- a plurality of switches for coupling either one of said first and second wireless transceivers to said antenna array.

13. A wireless location system for locating at least one wireless asset located in an area enclosed by a facility, comprising:
- a plurality of wireless locators mounted at fixed locations distributed in the area, each comprising a controller, at least one wireless transceiver and a plurality of antennas configured in an antenna array, and each capable of wirelessly communicating with at least one other wireless locator for conveying location information of the at least one wireless asset;
- a central processing system configured to communicate with at least one of said wireless locators for gathering said location information from each of said plurality of wireless locators;
- wherein said at least one wireless transceiver of each of said plurality of wireless locators is configured to receive a wireless location signal from a nearby wireless asset and takes a plurality of samples from said wireless location signal including a set of samples for each of said plurality of antennas; and
- wherein said controller of each of said plurality of wireless locators compresses said plurality of samples to generate said location information of said nearby wireless asset, and wherein said controller compresses said plurality of samples using at least one of multiple compression methods including averaging, bit reduction, phase angle only selection, and accumulation and selection.

14. The wireless location system of claim 13, wherein said controller compresses said plurality of samples by averaging each said set of samples for each of said plurality of antennas to provide a plurality of averaged samples as said location information.

15. The wireless location system of claim 13, wherein each of said plurality of samples comprises a complex number, and wherein said controller compresses said plurality of samples by converting each of said plurality of samples to a phase angle to provide only a plurality of phase angles as said location information.

16. The wireless location system of claim 13, wherein said controller accumulates multiple sets of said plurality of samples for a wireless asset being tracked, and wherein said controller then compresses said plurality of samples by averaging said multiple sets of said plurality of samples to provide averaged supplemental information as said location information.

17. A method of optimizing a backhaul communication network of a wireless location system in an area enclosed by a facility by each of a plurality of wireless locators mounted at fixed locations within the facility, wherein the plurality of wireless locators are distributed in the facility and wherein each includes an array of antennas, and a central processing system that is configured to communicate with at least one of the wireless locators for gathering location information from each of the plurality of wireless locators, said method comprising:
- receiving a location signal from a nearby wireless asset within the area of the facility and taking a plurality of samples from the location signal including a set of samples for each of the plurality of antennas;
- compressing the plurality of samples to generate compressed location information using at least one of multiple compression methods including averaging, bit reduction, phase angle only selection, and accumulation and selection; and
- wirelessly transmitting the compressed location information to another one of the plurality of wireless locators.

18. The method of claim 17, wherein said compressing comprises averaging each set of samples for each of the plurality of antennas to provide a plurality of averaged samples.

19. The method of claim 17, wherein each of the plurality of samples comprises a complex number, and wherein said compressing comprises converting each of the plurality of samples to a phase angle to provide only a plurality of phase angles as the location information.

20. The method of claim 17, further comprising:
- accumulating multiple sets of the plurality of samples corresponding to multiple location signals provided by the nearby wireless asset; and
- wherein said compressing comprises averaging corresponding samples of the multiple sets of the plurality of samples to provide averaged supplemental information.

* * * * *